Patented Jan. 14, 1941

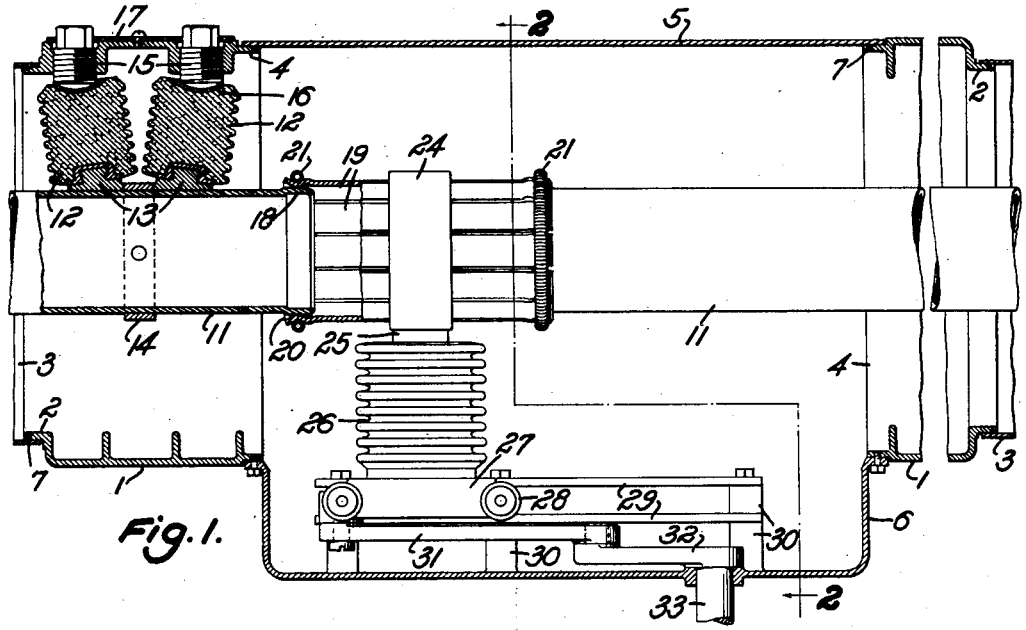

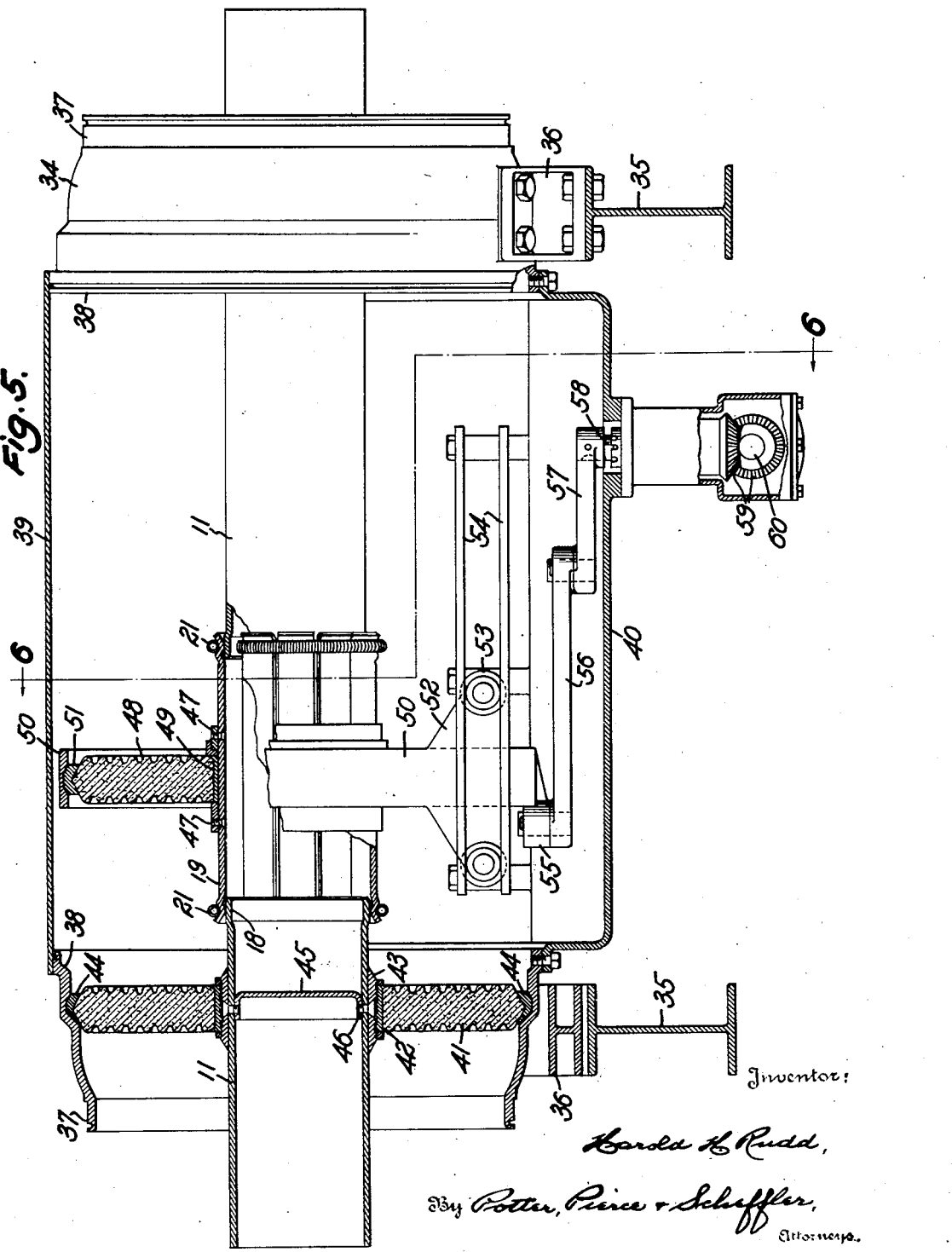

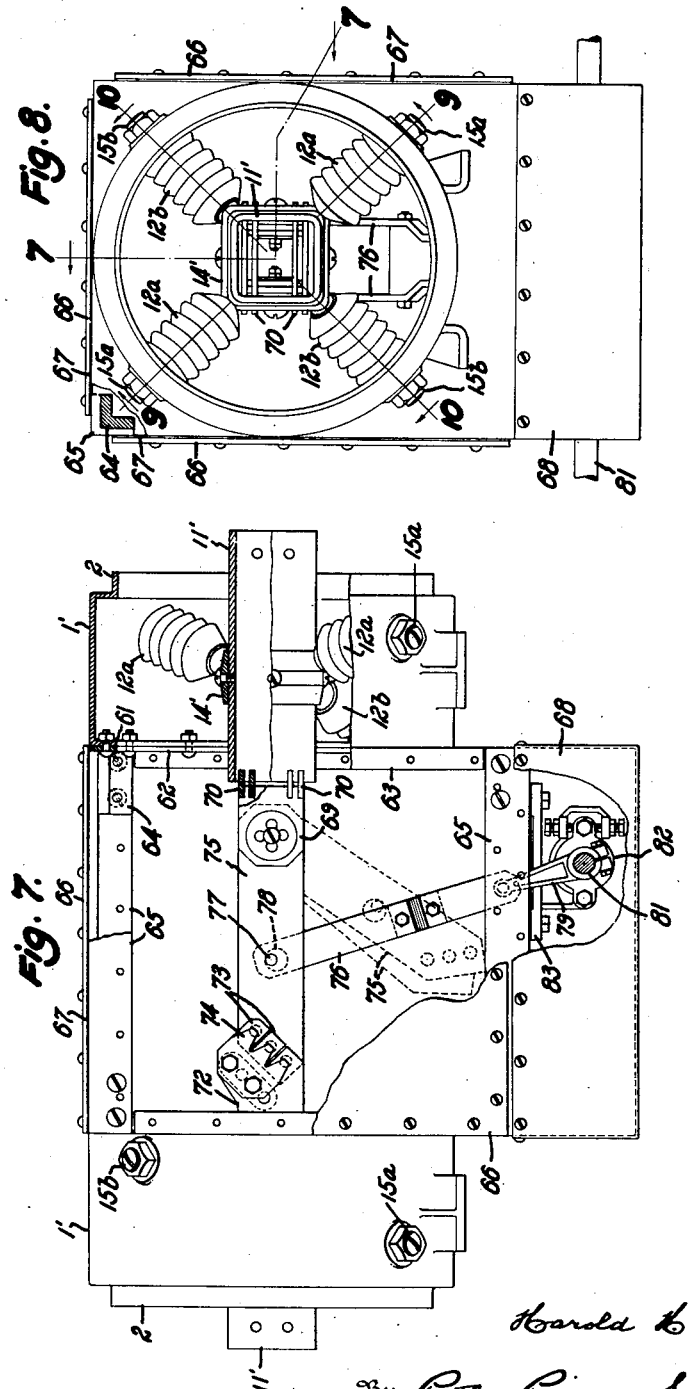

2,229,006

UNITED STATES PATENT OFFICE 2,229,006

DISCONNECT SWITCH

Harold H. Rudd, Greensburg, Pa., assignor to Railway and Industrial Engineering Company, Greensburg, Pa., a corporation of Delaware Application March 13, 1940, Serial No. 323,808

15 Claims. (Cl. 200—48)

This invention relates to disconnect switches and particularly to switches that may be used with or as a part of a metal-enclosed bus system.

A bus system having insulator frames or rings for supporting the bus by radially disposed insulators is described and claimed in my copending application Ser. No. 167,639, filed Oct. 6, 1937, Electrical bus systems. The enclosure or duct for each bus or conductor of a multiphase system was formed by curved plates or shells that extended between and were clamped to the flanges of adjacent insulator frames.

An object of this invention is to provide a disconnect switch for use in a bus system, the switch having an axially movable blade member that telescopes over a portion of the bus when the switch is opened. A further object is to provide an enclosed disconnect switch for use with a bus housed in a tubular duct, the switch having an approximately tubular housing of but slightly larger size than the bus duct. A further object is to provide a manually operable disconnect switch for a bus, the switch including a movable blade member on a reciprocating carriage, and a crank arm for reciprocating the blade carriage. An object is to provide an enclosed disconnect switch for use with a bus which is enclosed in a duct, the housing of the switch being substantially continuous with the bus duct and the switch including insulating members which seal the housing from the duct. More specifically, an object is to provide a disconnect switch for use with tubular bus sections, the movable member of the switch being a tubular member mounted for telescoping movement with respect to one bus section and adapted, when bridged across the bus sections, to contact with current-carrying bosses formed on the same.

These and other objects and advantages of the invention will be apparent from the following specification when taken with the accompanying drawings in which:

Fig. 1 is a section, substantially on the longitudinal axis, of a disconnect switch embodying the invention;

Fig. 2 is a transverse section as seen on line 2—2 of Fig. 1;

Fig. 3 is a fragmentary plan view, as seen from the inner side, of a contact finger of the switch blade;

Fig. 4 is an enlarged sectional view through the same on line 4—4 of Fig. 3;

Fig. 5 is a side elevation, with parts in section, of another embodiment of the invention;

Fig. 7 is a side elevation, with some parts broken away and others in section on line 7—7 of Fig. 8, of another embodiment of the invention;

Fig. 8 is an end view of the same;

Figure 9:
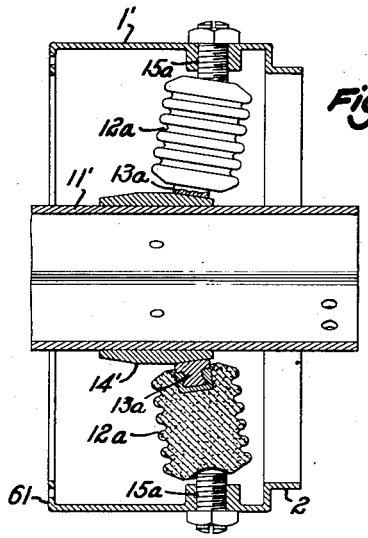
Figure 10:
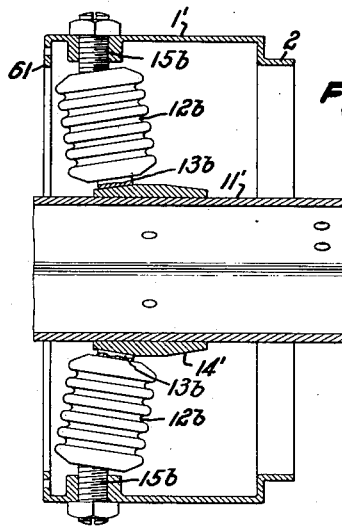
Figure 11:
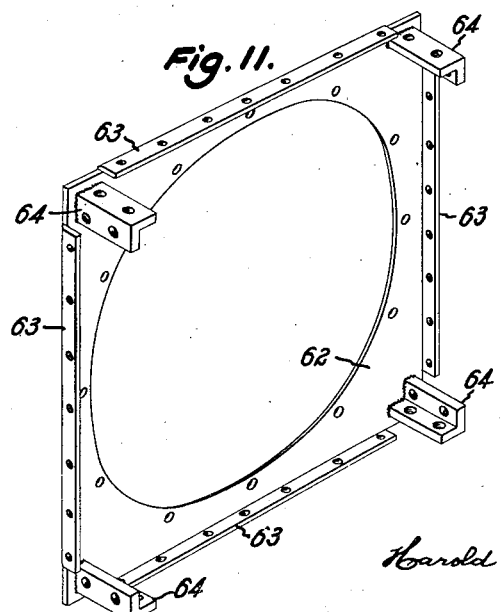

Figs. 9 and 10 are fragmentary sections on lines 9—9 and 10—10, respectively, of Fig. 8; and Fig. 11 is a perspective view of the plate member of an insulating ring.

In the drawings, the reference numeral 1 identifies a pair of axially alined ring or frame members which constitute the primary support for the disconnect switch and which have flanges 2 at their outer faces for supporting the ends of the plates 3 of the bus duct. Similar flanges 4 project from the inner faces of the frames 1 to support the ends of the curve plate 5 and the shell 6 which form a compartment for enclosing the disconnect switch. Thee flanges 2 and 4 are circumferentially grooved to receive gaskets 7, and gaskets 8 are arranged between the meeting edges of plate 5 and shell 6. The plate 5 and shell 6 are clamped to each other and to the flanges 4 by bolts 9 which pass through lugs 10 that are welded to the edges of the housing members.

The stationary members of the switch preferably have the same cross-section as that of the bus with which the switch is to be used, and the stationary members may be the ends of the bus members that are to be connected. As shown in Figs. 1 and 2, the switch members or bus ends 11 project axially through the frames 1 and into the switch chamber, the members 11 being rigidly supported within the frames by insulators 12 that have metal inserts 13 in contact with the switch members 11. The insulators 12 are arranged in pairs which are circumferentially spaced about the axis of the members 11, and the insulators of each pair are inclined toward each other with their inserts 13 engaging opposite edges of a thrust ring 14 that is fixed to the member 11. The insulators are adjusted toward the axis of the frame by pressure screws 15 that have rounded ends bearing against lead washers 16 within the concave outer ends of the insulators. The screws are threaded into the frames 1 from the exterior and are locked in adjusted position by a plate 17 that fits over the heads of the screws. It is to be noted that the insulators are subjected only to compression stresses as a result of transverse and axial thrusts upon the switch members 11.

The end portion 18 of each switch member 11 is circumferentially expanded to provide a contact area for engagement by the ends of the contact fingers 19 of the switch blade. The assembly of contact fingers 19 forms a hollow body of slightly larger diameter than the switch members 11, and the ends of the fingers 19 are shaped, preferably by stamping, to provide circumferential grooves 20 in which the coiled compression springs 21 are seated. Contact bosses 22 project inwardly from fingers 19 to restrict the contact engagement between the blade and each switch member to a plurality of approximately point contacts.

The contact fingers 19 may be formed by slotting the ends of a tube of copper or other resilient metal of good heat and electrical conductivity, or by welding or brazing separate contact strips to an inner sleeve 23 and to an outer sleeve 24 which has a stem 25 secured to the insulator 26. The insulator 26 is secured to the blade carriage 27 having flanged wheels 28 that engage the opposite rails 29 of a guideway. The rails 29 are parallel to the axis of the switch members 11 and are supported by posts 30 of the shell 6. A link 31 is pivotally connected to the blade carriage 27 and to the crank arm 32 of the operating shaft 33 that is journalled in and extends to the exterior of the shell 6.

The switch is shown in closed position in Figs. 1 and 2. The switch is opened by rotating shaft 33 and crank arm 32 through 180° to displace the blade carriage and blade toward the right, Fig. 1. The contact engagement is broken as soon as the contact members 22 of the blade are displaced from the contact projections 18 of the members 11, and the blade is then telescoped over the right hand member 11 to open a long air gap between it and the other member 11.

Disconnect switches are usually operated manually and may be damaged if the operator continues to rotate the hand wheel after the switch has reached its fully open or fully closed position. The crank arm and link mechanism eliminate this possibility of mechanical damage as the stroke or range of movement of the movable blade is restricted to definite limits by the length of the crank arm. The shaft 33 is normal to and its axis intersects the axis of the blade, thus bringing the link 31 and crank arm into alinement at the fully open and fully closed positions of the movable blade.

Figure 6:
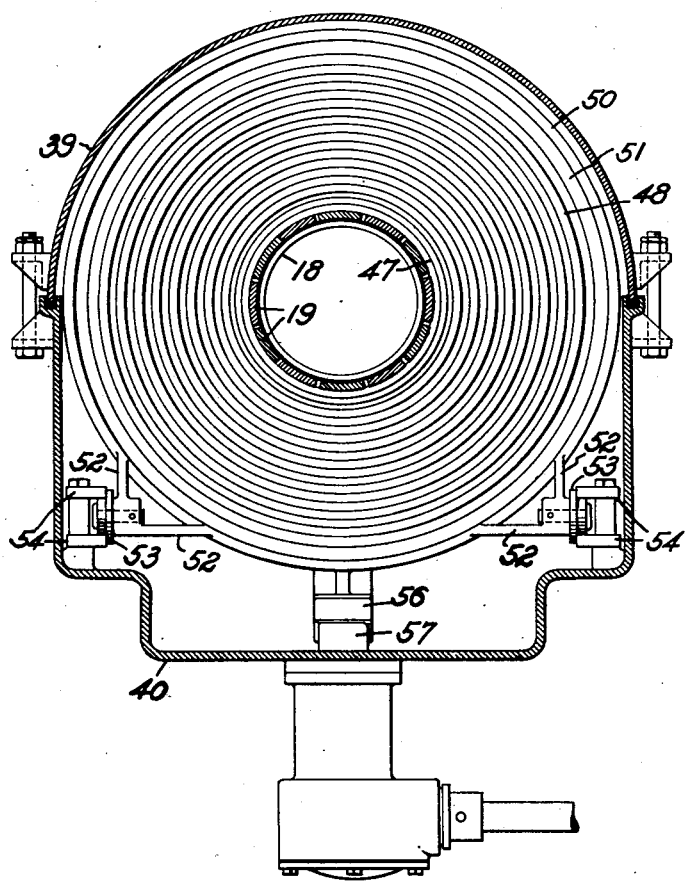
Fig. 6 is a transverse section on line 6—6 of Fig. 5.

The embodiment illustrated in Figs. 5 and 6 is generally similar to that illustrated in Figs. 1 to 4, inclusive. The ring or frame members 34 are secured to a support, indicated by the beams 35, by brackets 36. Each frame 34 is of approximately conical form with a small diameter annular flange 37 at its outer face for receiving the ends of the duct plates of the bus system, and a larger diameter annular flange 38 at its inner face. The housing members 39 and 40 are clamped to the flanges 38 and to each other to form the switch compartment.

The bus ends or switch members 11 extend through the ring frames 34 and are secured to the same by insulator disks 41 which seal the switch compartment from the adjacent sections of the bus duct.

The inner edge of each insulator disk 41 is secured to its switch or bus member 11 by casting a soft metal 42 between the disk and a flanged ring 43 that is fixed to member 11, and the outer edge of the disk is similarly secured to its ring frame 34 by cast metal 44. The bores of the hollow members 11 are sealed by plates 45 that are fixed in place by the screws or rivets 46 of the exterior rings 43.

The switch members 11 have projecting contact surfaces 18, and the cooperating switch blade has the flexible contact fingers 19 and spring ring 21, as described above. The blade assembly is formed by securing the contact strips 19 to the rings 47, and the blade is mounted within a disk insulator 48 by casting metal 49 between the disk and the rings 47. The annular frame 50 of the blade carriage has the disk 48 secured therein by cast metal 51, and the flanges 52 which flare away from the frame 50 provide supports for the flange wheels 53 that mount the carriage upon the guide rails 54. The lug 55 depends below the frame 50 to afford a pivotal connection to link 56 of crank arm 57. The crank arm is keyed to the shaft 58 that extends through the housing member 40 and is operated through bevel gears 59 and a shaft 60.

The sealing of the switch compartment from the adjacent duct sections is particularly desirable when the disconnect switches are not provided with a key interlock system for preventing closure of the disconnect switch when the circuit breakers of the bus system are closed. An inadvertent closure of a disconnect switch usually results in arcing and vaporization of the switch metal, and the flow of ionized gas and metal vapors along the bus duct may result in arcing or other damage at a point remote from the disconnect switch.

The paired arrangement of six bus supporting insulators 12, as shown in Figs. 1 and 2, is not necessary when the insulators are arranged in sets at opposite sides of the axis of the bus. This simpler insulator arrangement is shown in Figs. 7 to 10 in connection with a pivoted type of switch blade, but it can be used with the described telescoping switch blades.

The insulator frame rings 1', Figs. 7 to 10, have cylindrical flanges 2 and annular flanges 61 at their opposite faces to receive the semi-cylindrical plates of the duct and rectangular plates 62, respectively. The plates 62 are bolted to the ring frames and have circular openings coextensive with the openings through the annular flanges 61. The edges 63 of the plates are inturned except at the corners where short angle bars 64 are welded to the plates to support the long angle bars 65 that form the longitudinal supporting members of the switch housing. The top and side plates 66 are secured to the flanges 63 and angle bars 65, with gasket strips 67 interposed to provide tight or substantially tight seals, and the lower section 68 of the housing is a pan or shallow box of pressed steel that is secured to the lower flanges 63 and lower bars 65.

The bus members 11' that extend through the ring frames 1' may be of any desired shape and are illustrated as tubes of square cross-section. Each member 11' is supported within its ring 1' by four pillar type insulators that are angularly spaced by 90°, and the sets of insulators 12a, 12b in the two planes through the bus axis are inclined in opposite directions with respect to the bus axis. Metal inserts 13a, 13b of the insulators 12a, 12b, respectively, seat against the oppositely inclined faces of a thrust ring 14' that is secured to the bus, and screws 15a, 15b extend through threaded bosses of the ring 1' to force the insulators 12a, 12b, respectively, towards the bus. The bus members 11' are rigidly supported at the axis of the rings by a minimum number of insulators that also resist stresses transverse to the ring axis.

The disconnect switch of Figs. 7 and 8 is of the multiple blade type that is described in Patents 1,898,135 and 1,967,623 to Hemsley B. Massey. The hinge terminal includes a plurality of plates 69 that are connected to and supported upon one of the bus members 11' by plates or bars 70, and the jaw terminal comprises plates 72 that are similarly mounted upon the other bus member. The slotted ends 73 of the jaw plates are embossed to provide point contacts, and springs 74 engage the plates ends 73 to establish high contact pressures when the blades 75 are closed upon the jaw terminal, as shown in solid line in Fig. 7. The switch operating link 76 carries a pin 77 that fits snugly in openings in certain of the blades and extends loosely through openings 78 in other blades, whereby only the first group of blades is displaced upon initial opening movement of the link 76. The link 76 is connected to a crank arm 79 on an operating shaft 81 that extends through the lower housing section 68. In the usual case of alined disconnect switches for the three phases of a bus system, only a single bearing 82 is required for the shaft at each switch, the bearing being supported by a bracket 83 that is secured to one of the lower angle bars 65.

This application is a continuation-in-part of my copending application, "Disconnect switch," Serial No. 186,684, filed January 24, 1938.

It is to be understood that the invention is not restricted to the particular constructions as herein illustrated and described for use with a bus of the tubular conductor type. The telescoped switch construction is applicable to various types of bus constructions such as, for example, the "hollow square" type comprising a pair of channel-shaped conductors or four plates. The design of switches, either telescoping or pivoted, embodying the invention may be varied in accordance with the type of bus and bus duct in a particular installation, and it is therefore to be understood that the design, shape and relative proportions of the parts are subject to wide variation within the scope of my invention as set forth in the following claims.

I claim:

1. A disconnect switch for use with a duct-enclosed bus, said switch comprising a pair of spaced and axially alined frames, means at the opposite faces of each frame for receiving the ends of housing members, a plurality of housing members secured to said means of the frames and extending between the frames to form a switch chamber, a switch member extending through each frame and into said chamber, insulator means supporting said switch members in axial alinement and with the adjacent ends thereof spaced from each other, a blade, means supporting said blade for axial movement into and out of position to bridge across the ends of said switch members, and operating means for moving said blade axially of the alined switch members to open and to close said switch.

2. A disconnect switch for use with a duct-enclosed bus, said switch comprising a pair of spaced and axially alined frames, means at the opposite faces of each frame for receiving the ends of housing members, a plurality of housing members secured to said means of the frames and extending between the frames to form a switch chamber, a switch member extending through each frame and into said chamber, insulator means supporting said switch members in axial alinement and with the adjacent ends thereof spaced from each other, a blade, means supporting said blade for axial movement into and out of position to bridge across the ends of said switch members, and operating means carried by one of said housing members for moving said blade axially of the alined switch members to open and to close said switch.

3. A disconnect switch for use with a duct-enclosed bus, said switch comprising a pair of spaced insulator frames, flanges at the opposite faces of each frame for cooperation with plates to form an enclosure, a plurality of plates and means clamping the same to each other and to the adjacent flanges of said frames to form a switch chamber, insulator means within each frame, a pair of switch members supported by the respective insulator means, a blade member, and means for moving said blade to make and alternatively to break an electrical circuit between said switch members.

4. A disconnect switch as claimed in claim 3, wherein means is provided for sealing said switch chamber from the adjacent duct sections which enclose the bus.

5. A disconnect switch as claimed in claim 3, wherein means is provided for sealing said switch chamber from the adjacent duct sections which enclose the bus, said sealing means and said insulator means comprising disk-shaped insulators mounted in said frames and sealed respectively to said frames and to the switch members.

6. In apparatus of the type stated, a supporting frame, an electrical conductor extending axially through said frame, a disk-shaped insulator of annular form for supporting said conductor within said frame, and means sealing the outer edge of said insulator within said frame, and means sealing the inner edge of said insulator to said conductor.

7. A disconnect switch comprising a pair of axially spaced frames having substantially annular flanges at their adjacent faces, a plurality of housing members secured to said flanges to form a switch compartment, axially alined and longitudinally spaced switch members, a switch blade and means mounting the same for bridging said switch members, and means including a shaft extending through one of said housing members for actuating said blade member.

8. A disconnect switch comprising a pair of axially spaced frames having substantially annular flanges at their adjacent faces, a plurality of housing members secured to said flanges to form a switch compartment, axially alined and longitudinally spaced switch members, a switch blade and means mounting the same for telescoping movement with respect to said switch members, and means including a shaft extending through one of said housing members for actuating said blade member.

9. A disconnect switch as claimed in claim 8, wherein said mounting means includes a blade carriage supporting said blade member, and a guideway secured to one of said housing members for restricting movement of said blade carriage to translation parallel to said axially alined switch members.

10. In a disconnect switch for use between bus sections, a pair of switch members having axially alined and longitudinally spaced end sections presented towards each other, said end sections being hollow bodies of the same shape as the bus sections that are to be connected and having circumferentially enlarged contact portions, a switch blade of hollow form having inwardly directed projections for engagement with said contact portions of the switch members, a wheeled carriage supporting said blade, rails engaging the wheels of said carriage to guide the same for telescoping movement of the blade with respect to said switch members, and means for actuating said switch blade, said actuating means comprising a shaft normal to the axis of the blade, a crank arm secured to the shaft, and a link connecting said crank arm to said carriage.

11. In a disconnect switch for use with a duct-enclosed bus, a pair of axially spaced bus members, frames surrounding the respective bus members, two sets of insulators mounted on each frame for supporting the bus axially of the frame, the insulators of the respective sets being oppositely inclined with respect to the axis of the bus members to resist axial thrusts in opposite directions, a blade member, and means for displacing the blade member to establish or alternatively to break a connection of said bus members.

12. In a disconnect switch, the invention as claimed in claim 11, wherein the insulators of said sets are alined axially of said bus members.

13. In a disconnect switch, the invention as claimed in claim 11, wherein the insulators of the respective sets are angularly spaced from each other by not more than 90°.

14. In a disconnect switch, the invention as claimed in claim 11, wherein the insulators of the respective sets are angularly spaced from each other in planes at right angles to each other, there being two insulators in each set.

15. A disconnect switch of the type including the alined ends of two bus members, and a movable switch blade for bridging across said bus members, characterized by the fact that a frame member encircles each bus member, and four uniformly spaced insulators are carried by each frame member to support the bus members, the insulators in each diametrical plane through the axis of the bus member being inclined in the same direction with respect to the axis of the bus member, and the insulators in different diametrical planes being oppositely inclined.

HAROLD H. RUDD.